United States Patent
Traechtler

(10) Patent No.: US 6,600,974 B1
(45) Date of Patent: Jul. 29, 2003

(54) METHOD AND DEVICE FOR IDENTIFYING A ROLLING MOTION IN A VEHICLE

(75) Inventor: Ansgar Traechtler, Ditzingen-Hirschlanden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,783

(22) PCT Filed: Jun. 27, 2000

(86) PCT No.: PCT/DE00/02092

§ 371 (c)(1),
(2), (4) Date: Jul. 9, 2001

(87) PCT Pub. No.: WO01/02228

PCT Pub. Date: Jan. 11, 2001

(30) Foreign Application Priority Data

Jun. 30, 1999 (DE) .......................................... 199 29 830

(51) Int. Cl.[7] .................................................. B60T 8/00
(52) U.S. Cl. ............................... 701/1; 701/72; 701/83; 701/84; 188/112 A; 280/423.1; 303/140; 303/146
(58) Field of Search .................................. 701/1, 72, 83, 701/84; 303/140, 146, 123, 124; 280/407.1, 423.1, 432; 188/112 A

(56) References Cited

U.S. PATENT DOCUMENTS

| 3,758,165 A | * | 9/1973 | Savelli .................... 188/112 A |
| 3,893,692 A | * | 7/1975 | Presley et al. ........... 188/112 A |
| 3,948,567 A | * | 4/1976 | Kasselmann et al. ...... 180/14.1 |
| 3,972,543 A | * | 8/1976 | Presley et al. .............. 180/271 |
| 4,023,864 A | * | 5/1977 | Lang et al. ............... 188/112 A |
| 4,254,998 A | | 3/1981 | Marshall |
| 5,005,130 A | * | 4/1991 | Breen et al. .............. 188/112 A |
| 5,108,158 A | * | 4/1992 | Breen .......................... 280/243 |
| 5,411,322 A | * | 5/1995 | Breen .......................... 303/150 |
| 5,747,683 A | * | 5/1998 | Gerum et al. ................. 701/72 |

FOREIGN PATENT DOCUMENTS

| DE | 34 39 261 | 4/1986 |
| DE | 41 27 750 | 9/1992 |
| EP | 0 433 858 | 6/1991 |
| EP | 0 989 049 | 3/2000 |
| GB | 2 257 403 | 1/1993 |
| JP | 10 236 289 | 9/1998 |

* cited by examiner

Primary Examiner—Michael J. Zanelli
Assistant Examiner—Eric M Gibson
(74) Attorney, Agent, or Firm—Kenyon & Kenyon

(57) ABSTRACT

A device for detecting a pendulum motion of a vehicle. The device includes at least one first ascertainment arrangement, with which a lateral-motion-dynamics quantity is ascertained that represents the lateral motion dynamics of the vehicle. In addition, the device includes a second ascertainment arrangement with which a speed quantity is ascertained that describes the vehicular speed. With the aid of a third ascertainment arrangement it is ascertained, as a function of the at least one lateral-motion-dynamics quantity and the speed quantity, whether a pendulum motion of the vehicle exists. For that purpose, it is at least checked whether the at least one lateral-motion-dynamics quantity is greater than an associated threshold value and the speed quantity is greater than an associated threshold value. A pendulum motion of the vehicle exists when the lateral-motion-dynamics quantity is greater than the associated threshold value and when the speed quantity is greater than the associated threshold value.

21 Claims, 6 Drawing Sheets

METHOD AND DEVICE FOR IDENTIFYING A ROLLING MOTION IN A VEHICLE

FIELD OF THE INVENTION

The present invention relates to a method and a device for detecting a pendulum motion of a vehicle.

BACKGROUND INFORMATION

In a vehicle, which can be a vehicle combination composed of a towing vehicle and a trailer or semitrailer or a drawbar trailer, snaking movements or pendulum motions can occur due to crosswinds or other influences such as irregularities in the roadway. Since this problem occurs to a greater degree in vehicle combinations, and is by far more dangerous for such vehicles than for single vehicles, in the following, the device and the method of the present invention are discussed in view of vehicle combinations. However, this is not intended to represent any restriction. The use of the device and the method of the present invention is equally conceivable for individual vehicles.

If a vehicle combination experiences snaking movements or pendulum motions, then the trailer oscillates about its vertical axis, and, by way of the trailer coupling, also stimulates the towing vehicle to oscillate. If the vehicular speed is below a so-called critical speed, then the oscillations are damped. If the vehicular speed is equal to the critical speed, then the oscillations are undamped; if the vehicular speed is above the critical speed, then the oscillations increase in amplitude. The value of the critical speed is a function, inter alia, of geometric data such as wheel base and drawbar length, of the mass and the yaw moment of inertia of the vehicle and of the trailer, as well as of the slip-angle rigidity of the axles. In the case of vehicle combinations in the passenger-car sector, this value typically varies in the range from 90 to 130 kilometers per hour. The frequency of the oscillatory motion, i.e. of the pendulum motion, is approximately 0.5 to 1.5 Hz.

In the case of the vehicle dynamics controls presently on the market, such as are described, for example, in the publication "*FDR—Die Fahrdynamikregelung von Bosch*" (VDC—The Vehicle Dynamics Control of Bosch) which appeared in the *Automobiltechnischen Zeitschrift* (ATZ) (Automobile Technology Periodical) 96, 1994, issue 11 on pages 674 through 689, it may be that the above-described snaking movements lead to controller interventions; however, since these vehicle dynamics controls are primarily designed for single vehicles (in this case, passenger cars), and the regulation of the vehicle yaw rate is in the fore, the controller interventions are carried out in a manner which is not yet optimal. Against this background, there is a need to equip existing vehicle dynamics controls with a detection means by which pendulum motions can be recognized. Consequently, in response to an existing pendulum motion, the controller interventions best suited for this situation can be carried out.

Therefore, the present invention relates to a method and a device for detecting a pendulum motion of a vehicle. Such methods and devices are already known in a great variety of modifications from the related art.

Thus, for example, a method is known for improving the lateral stability of motor vehicles, in which vehicle-decelerating measures are taken when the amplitude of a vehicle lateral-motion-dynamics quantity oscillating within a predefined frequency band exceeds a predefined limiting value. To that end, it is ascertained whether a plurality of successive amplitudes of the vehicle lateral-motion-dynamics quantity exceed the limiting value allocated to it within a predefined time. This procedure requires far too much effort and is therefore costly, and thus is not well-suited for use in the vehicle sector. A consideration of the vehicular speed is not provided.

Also known is a system with which, inter alia, snaking of a vehicle is detected and which warns the driver when snaking is recognized. For this purpose, the vehicle contains a lateral-acceleration sensor. To detect the snaking, the frequency and the amplitude of the signal ascertained with the aid of the lateral-acceleration sensor are observed. In this case, the frequency is derived from the time interval of successive zero crossings. Because of the great expenditure, this procedure is also not well-suited for use in the vehicle sector. Snaking exists when the frequency thus determined lies within a predetermined frequency band, and when the amplitude is greater than a threshold value. In connection with this system, it is further suggested that, in addition to the lateral acceleration, the speed and/or the steering angle of the vehicle be considered. However, a concrete consideration of the speed or of the steering angle is not pointed out.

SUMMARY OF THE INVENTION

Starting from this known related art, the object of the present invention is to provide a method and a device, respectively, for detecting a pendulum motion of a vehicle which have a simpler design compared to the related art, and furthermore, get along with a lower expenditure of computing power.

At this point, reference is made to the SAE paper 973284 "*Vehicle Dynamics Control for Commercial Vehicles*", in which a vehicle dynamics control designed for a vehicle combination is described in a general manner. Both this publication and the above-indicated "*FDR—Die Fahrdynamikregelung von Bosch*" are hereby incorporated by reference The device of the present invention is a device for detecting a pendulum motion of a vehicle. This device includes at least one first ascertainment means with which a lateral-motion-dynamics quantity representing the lateral-motion dynamics of the vehicle is determined. The device also includes second ascertainment means with which a speed quantity describing the speed of the vehicle is determined. In a third ascertainment means, as a function of the at least one lateral-motion-dynamics quantity and the speed quantity, it is determined whether a pendulum motion of the vehicle exists. For that purpose, it is at least advantageously checked whether the at least one lateral-motion-dynamics quantity is greater than an associated threshold value, and the speed quantity is greater than an associated threshold value. A pendulum motion of the vehicle exists when the at least one lateral-motion-dynamics quantity is greater than the associated threshold value, and when the speed quantity is greater than the associated threshold value.

It is abundantly clear that a lateral-motion-dynamics quantity must be evaluated to recognize a pendulum motion, since the lateral-motion-dynamics quantity contains information about this motion. The speed quantity is evaluated for the following reason: As already mentioned at the outset, the progression of the pendulum motion is dependent to a great extent on the speed of the vehicle relative to the critical speed. If the vehicular speed lies below the critical speed, then it is a question of a damped pendulum motion which is less critical than an undamped pendulum motion or even a pendulum motion that is increasing in amplitude, since such a pendulum motion will end by itself after a while. That is to say, as long as the vehicular speed is below the critical speed, monitoring with regard to a pendulum motion is not absolutely necessary, and therefore also does not have to be carried out. Consequently, computing power for monitoring or detection, which in this case is not urgently necessary, is not tied up unnecessarily. At the same time, in order to have a certain safety reserve, the threshold value necessary for this is advantageously set to be lower by a safety distance than the actual critical speed. This represents a great advantage compared to the known related art, in which the monitoring or detection is carried out constantly, i.e., regardless of the vehicular speed.

As already mentioned at the outset, the device of the present invention for detecting a pendulum motion of a vehicle is used within the framework of a device for regulating a quantity describing the dynamics of the vehicle operation, particularly a quantity describing the yaw rate of the vehicle. As can be gathered from the above-indicated publication "FDR—Die Fahrdynamikregelung von Bosch", such a device for regulating a quantity describing the dynamics of the vehicle operation is originally provided with at least one lateral-acceleration sensor and a yaw-rate sensor which can be utilized within the framework of detecting a pendulum motion of a vehicle.

Against this background, the device of the present invention advantageously includes first detection means, particularly a lateral-acceleration sensor, for detecting the lateral acceleration acting on the vehicle. Therefore, using one of the first ascertainment means, it is possible to ascertain one of the lateral-motion-dynamics quantities as a function of the lateral acceleration of the vehicle. Alternatively or in addition thereto, the device of the present invention advantageously includes second detection means, particularly a yaw-rate sensor for detecting the yaw rate of the vehicle. Therefore, one of the first ascertainment means is used to ascertain one of the lateral-motion-dynamics quantities as a function of the yaw rate of the vehicle. It is particularly advantageous if the device of the present invention includes exactly two first ascertainment means. In each case one for the first detection means and one for the second detection means. This permits a more accurate detection of the pendulum motion, since two quantities, ascertained independently of one another, are available for the evaluation.

It has proven to be particularly advantageous when a difference is determined between a yaw-rate setpoint value and the yaw rate of the vehicle, and when one of the lateral-motion-dynamics quantities is ascertained as a function of this difference. In this context, the setpoint value for the yaw rate is determined with the aid of a suitable vehicle model as a function of the vehicular speed and the steering angle adjusted by the driver. Therefore, the lateral-motion-dynamics quantity ascertained in this manner contains information about the steering motion carried out by the driver. That is to say, information is thus available concerning, for example, whether or not the driver is driving a slalom-type course, and the pendulum motion arising in this case is desired by the driver, i.e., is not caused by external influences such as crosswind.

Alternatively or in addition to the above-described consideration of the difference, it has proven to be advantageous that the device includes fourth ascertainment means with which a steering quantity is ascertained that represents the steering motion carried out by the driver. The steering quantity is advantageously ascertained as a function of the steering angles adjusted by the driver over a predetermined period of time. The consideration of a period of time yields meaningful information about the steering motion of the driver, since various steering angles adjusted by the driver during this period of time are taken into account. This ascertainment is advantageously carried out using an integrating means.

Since small steering angles, i.e., steering angles attributable to slight steering motions of the driver, usually do not lead to a pendulum motion of the vehicle, small steering angles are not considered when ascertaining the steering quantity. These small steering angles are masked out by using a masking means having a suitably selected dead zone which can be postulated as generally known. That is to say, of the steering angles detected by the steering-angle sensor and supplied as input quantities to the masking means, the masking means only outputs as output quantities those steering angles whose values do not lie within the dead zone which describes a value range for the value of the steering angle. Alternatively or in addition thereto, steering angles resulting from changes in the steering angle proceeding slowly over time are likewise not considered. This, against the background that changes in the steering angle proceeding slowly over time usually do not lead to a pendulum motion of the vehicle. The steering angles resulting from changes in the steering angle proceeding slowly over time are advantageously filtered out by using a high-pass filter.

The ascertainment taking place in the third ascertainment means is furthermore carried out as a function of the steering quantity. The detection of the pendulum motion is advantageously not carried out when the value of the steering quantity is greater then an associated threshold value, since it can then be assumed that the pendulum motion of the vehicle is attributable to steering motions executed by the driver, i.e., driving maneuvers such as a slalom-type drive, and thus is desired by the driver.

The two procedures indicated above, first of all the evaluation of the difference and secondly the ascertainment of a steering quantity, can be used simultaneously in redundant manner.

It has proven to be particularly advantageous that the value of the threshold value associated with the at least one lateral-motion-dynamics quantity and/or the value of the threshold value associated with the speed quantity is/are dependent on whether a pendulum motion was detected. In this context, the value utilized when a pendulum motion was detected is smaller than the value which is used as long as no pendulum motion was yet detected. That is to say, due to the smaller value when a pendulum motion was detected, the interventions in the engine and/or in the individual brakes which are carried out based on the detection are performed for a longer time than in the case of a greater value. This yields an additional safety reserve. Generally formulated, the above-described procedure defines a hysteresis function in the establishment of the values.

As already explained at the outset, the pendulum motions of the vehicle occur in a predetermined frequency range. Consequently, a first measure in detecting a pendulum motion of a vehicle is to determine whether signals or quantities which are characteristic or representative for a pendulum motion are present in this frequency range. In this connection, it has proven to be particularly advantageous that the at least one first ascertainment means includes a first filtering means, particularly a band-pass filter. The use of a band-pass filter is far less costly compared to the methods from the related art (observing a timing window, determining zero crossings).

Using the filtering means, it is possible in a simple manner and, in addition, without great expenditure compared to the related art, to filter out from the input quantities supplied to the first ascertainment means for ascertaining the lateral-motion-dynamics quantity, those components which lie in the predetermined frequency range that is characteristic for the pendulum motion of the vehicle. The lateral-motion-dynamics quantity is then ascertained as a function of the filtered-out components. As already explained earlier, the input quantities mentioned above are the lateral acceleration acting on the vehicle or the yaw rate of the vehicle or the difference determined between the yaw rate for the vehicle and the setpoint value for the yaw rate.

As is customary for vehicles equipped with an operating dynamics control, the device includes means for influencing the torque supplied by the engine and/or for influencing the brakes allocated to the wheels of the vehicle. In response to a detected pendulum motion of the vehicle, the means for influencing the torque supplied by the engine and for influencing the brakes allocated to the wheels of the vehicle are advantageously driven along the lines of reducing the vehicular speed. In this context, the brakes are advantageously uniformly activated. The following is achieved by reducing the vehicular speed: The vehicular speed again falls below the critical speed, which means pendulum motions already present are damped, and the trailer is thereby stabilized again. That is, the interventions return the speed of the vehicle to a non-critical range.

Alternatively, in response to a detected pendulum motion of the vehicle, the brakes allocated to the wheels of the vehicle are activated individually, such that a yawing moment is thereby produced which acts on the vehicle and counteracts the pendulum motion. Stabilization of the vehicle is achieved in this manner as well, which in addition, has the advantage that it goes along with a reduction in the vehicular speed which is barely perceptible to the driver. The implementation of the wheel-individual braking described above, which advantageously proceeds in phase opposition to the pendulum motion to be suppressed, can be regarded, so to speak, as an adaptation of the actual vehicle dynamics control, i.e., of the actual vehicle dynamics controller, because in this context, interventions are carried out which are not attributable to the control concept upon which the vehicle dynamics control is based, but rather, in this case, the actual interventions of the vehicle dynamics control are prevented.

The above-mentioned activation of the vehicle brakes is to be understood as follows: If the vehicle is a single vehicle, then its brakes are activated. If the vehicle is a vehicle combination, then there are various possibilities depending on the equipment of the trailer or semitrailer. If only the towing vehicle is provided with brakes allocated to the wheels, then only they are activated. If the trailer or semitrailer is also provided with brakes allocated to the wheels, then the brakes of the towing vehicle or those of the trailer or semitrailer can be activated individually, or else jointly as well.

According to a first exemplary embodiment, the at least one first ascertainment means includes means for forming an average value, with which the lateral-motion-dynamics quantity is determined by averaging as a function of the filtered-out components. The means for forming the average value is advantageously a low-pass filter. The at least one first ascertainment means advantageously also includes an absolute-value generating means with which the absolute values of the filtered-out components are determined prior to forming the average value. The lateral-motion-dynamics quantity obtained in this manner is a measure for the instantaneous amplitude, and therefore the intensity of the pendulum motion. The absolute-value generation and the subsequent averaging produce a quantity which no longer exhibits fluctuations, and therefore represents a clear and meaningful criterion.

According to a second exemplary embodiment, the at least one first ascertainment means includes means by which, as a function of the filtered-out components, an amplitude quantity is determined which represents the amplitude of the input quantity supplied to the first ascertainment means. In this context, the amplitude quantity corresponds to the lateral-motion-dynamics quantity. In addition, the at least one first ascertainment means includes second means by which an interference quantity is ascertained as a function of the filtered-out components. The interference quantity represents the components of the input quantity supplied to the first ascertainment means which are indeed contained in this input quantity, but which are independent of the vehicle pendulum motion to be ascertained. In other words, it may be that the components underlying the interference quantity are contained in the input quantity, but they are not attributable to a pendulum motion of the vehicle. For example, the interference quantity represents influences such as can occur when driving on a rough roadway or during a lane change executed by the driver.

The ascertainment taking place in the third ascertainment means is furthermore carried out as a function of the interference quantity. In this context, it has proven to be advantageous that the detection of the pendulum motion is not carried out when a relationship formed by the interference quantity and the amplitude quantity is greater than an associated threshold value.

The interference quantity makes available a criterion with which the detection of the pendulum motion of the vehicle can be improved to the effect that situations which do not clearly correspond to a pendulum motion of the vehicle are not considered.

In turn, the first means contained in the at least one first ascertainment means include signal-generating means by which two signals are generated that are shifted by a predefined phase, particularly 900. These two signals advantageously have the same amplitude. The first means also include demodulation means by which two demodulated signals are generated as a function of the filtered-out components and the two signals generated by the signal-generating means. The demodulation means are advantageously designed as multiplier means. Moreover, the first means include filtering means which are advantageously designed as low-pass filters and by which the demodulated signals are filtered. The amplitude quantity is ascertained as a function of the demodulated filtered signals thereby obtained.

The two signals generated with the aid of the signal-generating means are periodic signals whose frequency corresponds to the vehicle pendulum or rolling frequency to be expected. Through the demodulation, which corresponds to a multiplication, the filtered-out components exhibiting the pendulum frequency are converted into a direct component and into an oscillation with double frequency. The direct components which contain the actual information about the pendulum motion are filtered out by the downstream low-pass filters. This procedure corresponds in its totality to a band-pass filtering having very high quality.

The second means contained in the at least one first ascertainment means include modulation means which are advantageously designed as multiplier means by which two modulated signals are generated as a function of the two filtered demodulated signals and the two signals generated by the signal-generating means. These two modulated signals are supplied to an addition means having downstream weighting means, the addition means and the weighting means ascertaining a quantity which represents the vehicle pendulum motion to be ascertained or detected, but which is free of interference effects. That is to say, the quantity ascertained by the addition means and the weighting means represents the pendulum motion of the vehicle that is to be ascertained or detected, but has no components resulting from interference effects. That means that this quantity describes the pendulum motion in an unadulterated fashion. Through the modulation, the two direct components are converted again into periodic signals whose frequency corresponds to that of the pendulum motion.

Furthermore, the second means include a subtractor means with which, as a function of the filtered-out components and the quantity which represents the vehicle pendulum motion to be ascertained or to be recognized, but which is free of interference effects, a quantity is determined from which the interference quantity is ascertained by absolute-value generation and filtering, particularly with the use of a low-pass filter. The absolute-value generation and filtering ensure that the interference quantity does not exhibit any fluctuations which are all too large, and therefore represents a meaningful criterion. The above-described subtraction takes advantage of the fact that the filtered components still have the interference components mentioned above, whereas the two filtered and demodulated signals, from which the quantity is ascertained which represents the pendulum motion of the vehicle free from interference effects, is free of these interference components. The ascertainment of the interference quantity is thus possible.

As already mentioned at the outset, the vehicle should be a vehicle combination composed of a towing vehicle and a trailer or semitrailer. Consequently, the intention is to use the device of the present invention to detect a pendulum movement of the trailer or semitrailer. In the same way, a pendulum movement produced by the trailer or semitrailer and transferred to the towing vehicle should be detected. All the detection means and/or sensor means necessary for detecting the pendulum movement are advantageously allocated to the towing vehicle. Therefore, a cost-intensive outfitting of all trailers or semitrailers belonging to a fleet of vehicles with the sensors necessary according to the present invention is not necessary.

In the case of a vehicle combination, the detection of a pendulum motion is advantageously only carried out when a trailer or semitrailer is also actually coupled to the towing vehicle. To be able to recognize this situation, the device includes means which are used to determine whether a trailer or semitrailer is coupled to the towing vehicle. This procedure contributes, first of all, to an increase in safety. Secondly, the necessary computing power or computing capacity, and at the same time the computing time as well, are reduced, since the detection of the pendulum motion is only carried out when an occasion actually exists for the development of a pendulum motion, namely, when a trailer or semitrailer is coupled to the towing vehicle.

The determination as to whether a trailer or semitrailer is coupled to the towing vehicle is advantageously carried out by checking an electrical contact. That is to say, a check is made as to whether an attachment plug belonging to the trailer or semitrailer is connected to an outlet mounted on the towing vehicle. Various procedures present themselves for this purpose.

Thus, for example, at least one brake light of the trailer or semitrailer can be triggered independently of the driver. Whether a trailer or semitrailer is coupled can be determined by monitoring current. If a current flows in a line allocated to the brake light during the triggering, this is an indication that a trailer or semitrailer is coupled to the towing vehicle. In addition to the driver-independent triggering of the brake light—in this case no braking process exists which is initiated by the driver—it is also conceivable to evaluate a braking process, initiated by the driver, within the framework of the aforesaid detection. In the cases described, the electrical contact is checked in terms of a flowing current.

Furthermore, a latching relay can also be used within the framework of detecting whether a trailer or semitrailer is coupled. The relay responds when an electric circuit is produced at the socket to the trailer.

The information about whether a trailer or semitrailer is coupled to the towing vehicle can be supplied to the control unit, or to the components contained in the control unit for processing this information, via a CAN bus provided in the vehicle.

At this point, it should be noted that any subsequent naming of the term trailer is always intended to include the two other types—semitrailer and drawbar trailer—as well.

DETAILED DESCRIPTION

Exemplary Embodiments

Figure 1:
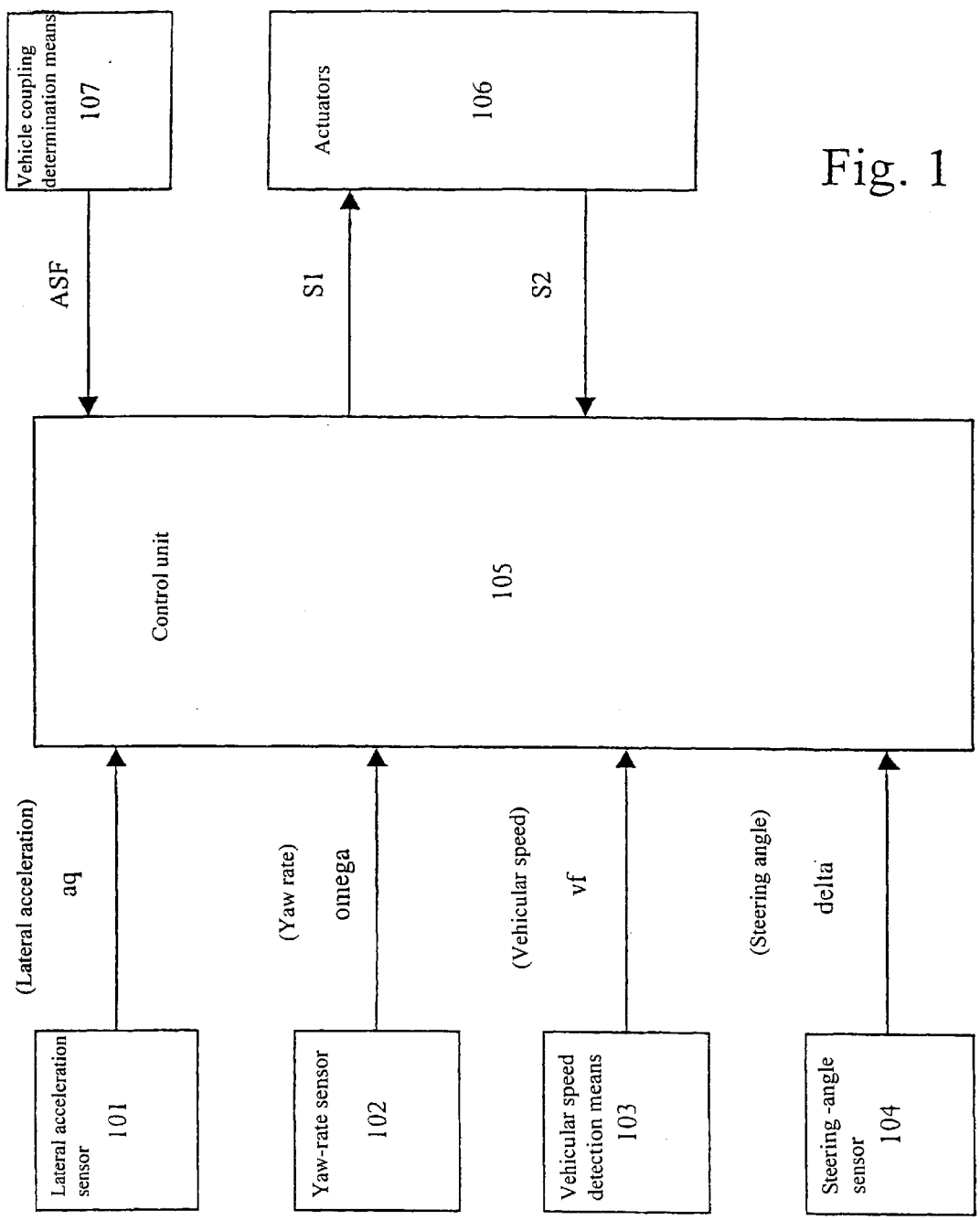
FIG. 1 is a block diagram which shows a control unit in which the device of the present invention is employed, together with the sensors and actuators belonging to the control unit.

FIG. 1 shows in general form a control unit 105. For example, this control unit is one which is used within the framework of a vehicle dynamics control. With respect to further details, reference is made at this point to the publication "*FDR—Die Fahydynamikregelung von Bosch*". Various sensor signals are supplied to the control unit. These signals are lateral acceleration aq ascertained by a lateral-acceleration sensor 101, yaw rate omega of the vehicle ascertained by a yaw-rate sensor 102, steering angle delta ascertained by a steering-angle sensor 104, and vehicular speed vf detected by suitable means 103. For example, means 103 are wheel-speed sensors, allocated to the vehicle wheels, with downstream evaluation means.

Based on the input quantities supplied to the control unit, in accordance with the control concept stored in it, the control unit generates driving signals S1 for actuators 106 allocated to it. For example, the actuators are means for influencing the torque supplied by the engine and/or for influencing brakes allocated to the vehicle wheels. In turn, the brakes can be part of a hydraulic or an electrohydraulic or a pneumatic or an electropneumatic or an electromechanical braking system. Starting from actuators 106, signals S2 which provide the control unit with information about the operating state of the actuators are supplied to the control unit.

In addition, starting from a block 107 which represents means used to determine whether a trailer or semitrailer is coupled to the towing vehicle, a signal ASF is supplied to control unit 105. Signal ASF can be generated in the manner mentioned at the outset. In this context, the following should be applicable: When a trailer or semitrailer is coupled to the towing vehicle, the value 1 is assigned to signal ASF. The practical evaluation of signal ASF is discussed in detail in connection with FIGS. 3 or 6.

In the following, a first exemplary embodiment is explained with reference to FIGS. 2 and 3.

Figure 2:
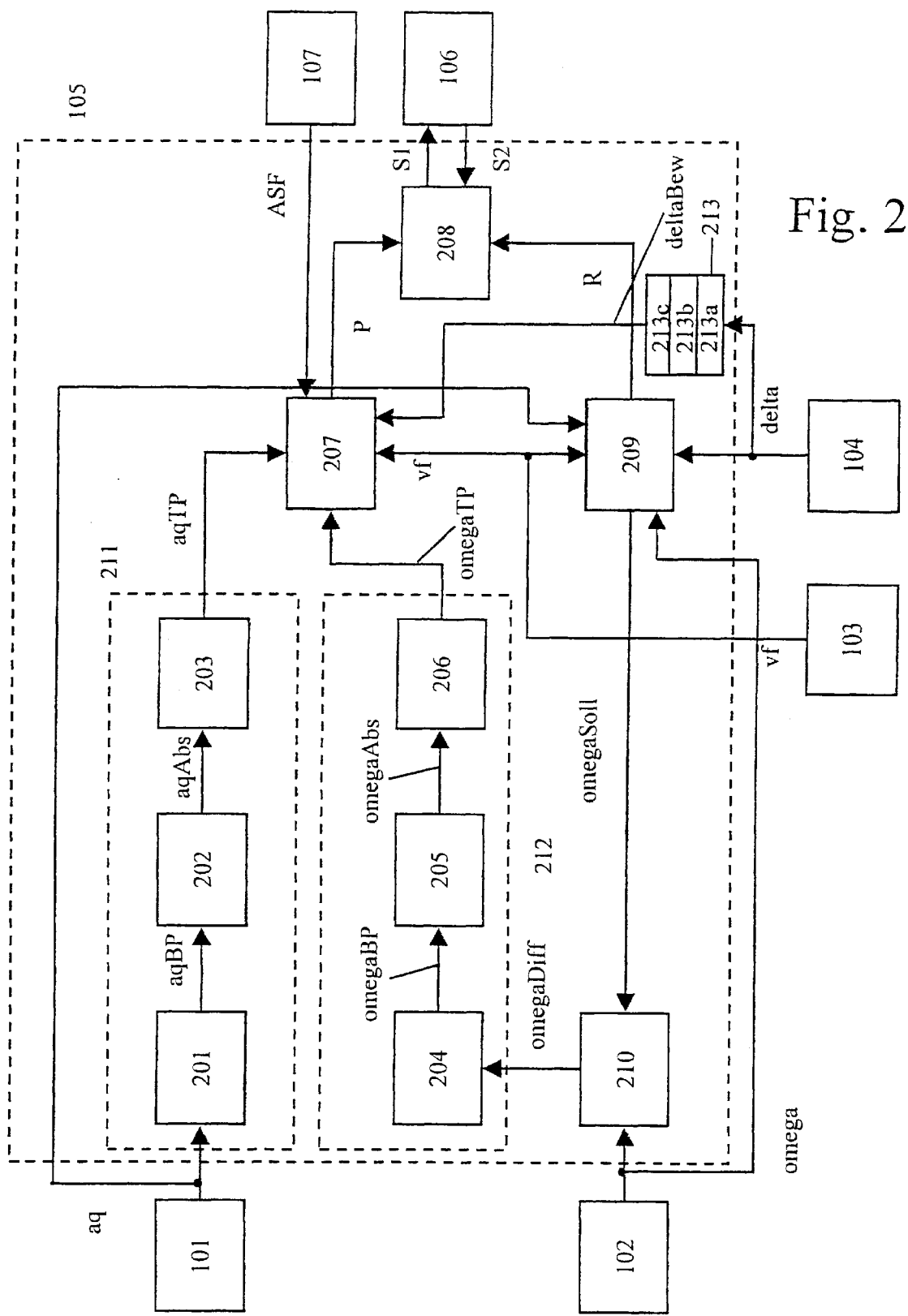
FIG. 2 is a block diagram which shows the construction of the device according to an embodiment the invention.

In FIG. 2, the components contained in the control unit are indicated by a dotted-line block 105. Discussed first is block 209 which represents the controller core contained in control unit 105. The publication "*FDR—Die Fahrdynamikregelung von Bosch*" provides a detailed description of controller core 209.

Lateral acceleration aq acting on the vehicle and determined by block 101, yaw rate omega of the vehicle determined by block 102, vehicular speed vf detected by block 103, as well as steering angle delta determined by block 104 are supplied to the controller core. As already mentioned, control unit 105 is a control unit for controlling the vehicle dynamics, particularly for controlling the yaw rate of the vehicle. To that end, yaw rate omega, which is supplied to the controller core, is compared to a setpoint value omegasoll for the yaw rate. Setpoint value omegasoll is determined in the controller core with the aid of a suitable vehicle model as a function of vehicular speed vf and steering angle delta. As a function of the deviation resulting from yaw rate omega and setpoint value omegasoll, quantities R are determined with which actuators 106 are to be driven along the lines of a yaw-rate control. Quantities R are supplied to a block 208.

Setpoint value omegasoll for the yaw rate is supplied to a block 210 in which, as a function of this setpoint value and yaw rate omega, a difference omegaDiff is formed which is supplied to a block 204. Block 204 is a filtering means, particularly a band-pass filter. Filtering means 204 filters components omegaBP, which lie in a predetermined frequency range that is characteristic for the pendulum motion of the vehicle, out of difference omegaDiff. Filtered-out components omegaBP are supplied to a block 205 which is an absolute-value generating means, and with which absolute values omegaAbs of filtered-out components omegaBP are determined. Absolute values omegaAbs are supplied to a means for forming an average value, designed in particular as a low-pass filter. Average value omegaTP, which is formed from the absolute values and corresponds to the lateral-motion-dynamics quantity ascertained as a function of the yaw rate, is supplied to a block 207 which is a third ascertainment means.

Blocks 204, 205 and 206 are combined in FIG. 2 to form a first ascertainment means 212, the difference omegaDiff representing the input quantity of this ascertainment means. At this point, it should also be mentioned that, instead of the difference, it is also possible to merely supply yaw rate omega as input quantity to first ascertainment means 212. The procedure in ascertaining lateral-motion-dynamics quantity omegaTP remains unaffected by this.

In addition to first ascertainment means 212, the device of the present invention includes a further first ascertainment means 211 which is constructed identically to first ascertainment means 212. Lateral acceleration aq, determined with the aid of lateral-acceleration sensor 101, is supplied as input quantity to first ascertainment means 211. Corresponding to the procedure described in connection with first ascertainment means 212, first of all, with the aid of a filtering means 201, filtered-out components aqBP are ascertained which are supplied to an absolute-value generating means 202 by which absolute values aqAbs are ascertained that, in turn, are supplied to a means for forming an average value 203 which, from absolute values aqAbs, ascertains average value aqTP that corresponds to the lateral-motion-dynamics quantity ascertained based on the lateral acceleration. Lateral-motion-dynamics quantity aqTP is also supplied to block 207.

Besides the two lateral-motion-dynamics quantities aqTP and omegaTP, vehicular speed vf as well as a steering quantity deltaBew are also supplied to block 207. Steering quantity deltaBew is ascertained in a block 213 as a function of steering angle delta supplied to this block. For this purpose, the steering angle is initially supplied to a masking means 213a having a suitably selected dead zone, by which small steering angles are masked out. The steering angles allowed through by masking means 213a are supplied to a high-pass filter 213b. The high-pass filter filters out steering angles resulting from steering-angle changes proceeding slowly over time. The remaining steering angles are supplied to an integrating means 213c by which the remaining steering angles are integrated and output as steering quantity deltaBew. In the overall view, the steering quantity is ascertained as a function of the steering angles adjusted by the driver over a predetermined period of time; however, small steering angles and/or steering angles resulting from steering-angle changes proceeding slowly over time are not considered.

Figure 3:
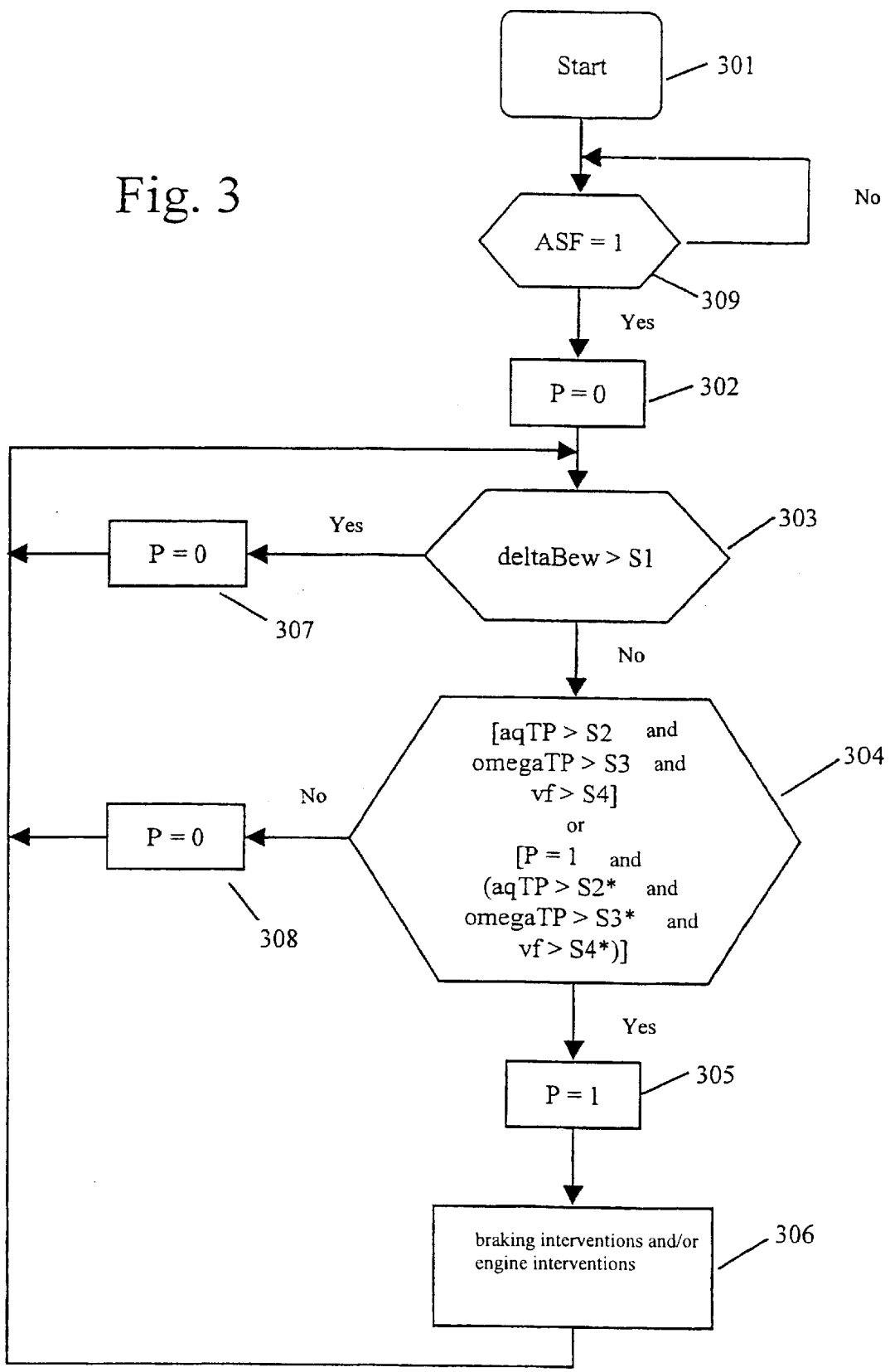
FIG. 3 is a flowchart which shows the sequence of the method according to an embodiment of the present invention.

The practical procedure underlying block 207 with respect to detecting a pendulum motion of a vehicle is presented in detail in connection with FIG. 3. At this point, it should be stressed in advance that, in response to a detected pendulum motion of the vehicle, block 207 outputs a corresponding value for quantity P.

Quantity P generated in block 207 is supplied to block 208. Block 208 coordinates the interventions to be carried out by actuators 106 on the basis of quantities P and R, respectively, supplied to block 208. In so doing, the following procedure is conceivable: As long as no pendulum motion of the vehicle is detected (P=0), the interventions necessary within the framework of the vehicle dynamics control for stabilizing the vehicle are carried out with the aid of actuators 106 on the basis of quantity R. However, as soon as a pendulum motion of the vehicle is detected (P=1), either the interventions necessary for eliminating the pendulum motion are carried out on the basis of quantity P instead of the interventions to be implemented within the framework of the vehicle dynamics control for stabilizing the vehicle, or else the interventions necessary within the framework of the vehicle dynamics control for stabilizing the vehicle are modified in such a way on the basis of quantity P that, in addition to the stabilization of the vehicle to be carried out within the framework of the vehicle dynamics control, the pendulum motion is also eliminated at the same time. The above-described masking-out or modification can also be understood as adaptation of the controller.

Starting from block 107, signal ASF which indicates whether a trailer or semitrailer is coupled to the towing vehicle is also supplied to block 207.

The significance of quantities S1 and S2 which are exchanged between blocks 208 and 106 was already discussed in detail in connection with FIG. 1.

FIG. 3 shows the sequence of the method upon which the first exemplary embodiment is based. The method begins with a step 301 which is followed by a step 309. In this step, signal ASF is evaluated. If it is determined that signal ASF has the value 1, which is synonymous with the fact that a trailer or semitrailer is coupled to the towing vehicle, then subsequent to step 309, a step 302 is carried out which begins the actual detection of a pendulum motion. On the other hand, if it is determined that signal ASF does not have the value 1, then step 309 is carried out once more. The query conducted in step 309 ensures that the detection of a pendulum motion is only implemented when a trailer or semitrailer is actually also coupled to the towing vehicle.

At this point, it should be stressed that step 309 is optional and is not absolutely necessary for carrying out the function of detecting a pendulum motion, so that it may also be omitted. If step 309 is omitted, then block 107 shown in FIGS. 1 and 2 is also not necessary.

In step 302, quantity P, which is a flag and which indicates whether a pendulum motion of the vehicle is present, is initialized. In the present case, value 0 is assigned to quantity P, i.e., it is assumed that no pendulum motion is present. Subsequent to step 302, a step 303 is carried out in which steering quantity deltaBew is evaluated. To this end, it is checked whether steering quantity deltaBew is greater than an associated threshold value S1. If it is determined in step 303 that the steering quantity is greater than threshold value Si, which is synonymous with the situation that the steering motions performed by the driver do not allow the detection of a pendulum motion, and/or the steering motions cause detection to appear unnecessary since, for example, a slalom-type drive is presupposed which causes the pendulum motion, then subsequent to step 303, a step 307 is carried out in which the value 0 is assigned to quantity P. After step 307, step 303 is carried out once more. On the other hand, if it is determined in step 303 that the steering quantity is less than threshold value Si, which is synonymous with the situation that the steering motions executed by the driver allow the detection of a pendulum motion, and/or the steering motions cause detection to appear unnecessary since, for example, a slalom-type drive is presupposed which causes the pendulum motion, then subsequent to step 303, a step 304 is carried out.

In step 304, two partial queries are performed. The first partial query, which includes no individual query concerning quantity P, relates to the situation in which a pendulum motion of the vehicle was not yet detected. In the first partial query, the following individual queries are checked: Is lateral-motion-dynamics quantity aqTP greater than a threshold value S2? Is lateral-motion-dynamics quantity omegaTP greater than a threshold value S3? Is speed quantity vf greater than a threshold value S4? When these three individual queries are all satisfied simultaneously, then the first partial query is satisfied.

The second partial query contains an individual query with respect to quantity P, and thus the situation in which a pendulum motion of the vehicle was already detected. In this individual query, it is checked whether the value 1 is assigned to quantity P. Moreover, the second partial query includes the three individual queries contained in the first partial query; however, threshold values S2, S3 and S4 used within the framework of the first partial query are replaced by threshold values S2*, S3* and S4*, whose values are in each case smaller than those of threshold values S2, S3 and S4. When all four individual queries are satisfied, then the second partial query is satisfied.

If it is determined in step 304 that the first partial query or the second partial query is satisfied, i.e., it is determined that one of the two partial queries is satisfied, which is synonymous with the fact that a pendulum motion of the vehicle exists, then subsequent to step 304, a step 305 is carried out, in which the value 1 is assigned to quantity P. Following step 305, a step 306 is carried out in which the braking interventions and/or engine interventions for eliminating the pendulum motion are implemented by appropriate activation of the wheel brakes and/or driving of the means for influencing the torque supplied by the engine. Subsequent to step 306, step 303 is carried out once more. On the other hand, if it is determined in step 304 that neither of the two partial queries is satisfied, then following step 304, a step 308 is carried out in which the value 0 is assigned to quantity P. Subsequent to step 308, step 303 is carried out once more.

At this point, it should be mentioned that a different embodiment of the two partial queries performed in step 304 is also conceivable. Thus, the partial queries can also be so designed that the three individual queries, which in detail relate to the vehicular speed, the lateral acceleration and the yaw rate, do not have to be satisfied simultaneously for the partial query to be satisfied. It would also be conceivable that, per partial query, the individual query for the speed and one of the two individual queries which relate to the lateral acceleration and the yaw rate, respectively, must be satisfied simultaneously.

In the following, a second exemplary embodiment is described with the aid of FIGS. 4, 5, and 6.

Figure 4:
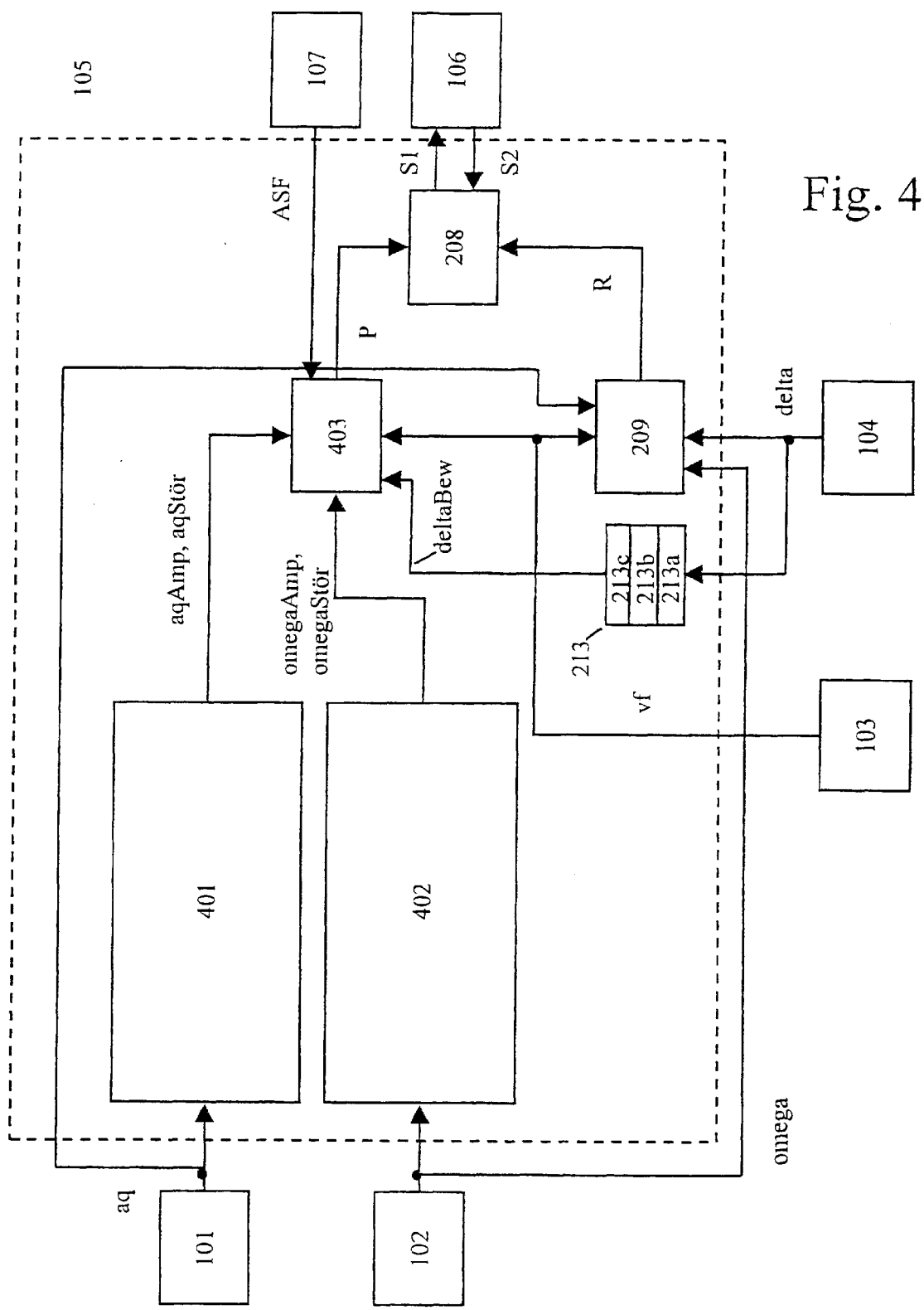
FIG. 4 shows a high-level schematic block diagram of the device according to an embodiment the present invention.

In FIG. 4, the components contained in the control unit are combined to form dotted-line block 105. The blocks already described in connection with FIG. 2—which in detail are blocks 106, 208, 209 and 213, as well as detection means 101, 102, 103 and 104—are no longer discussed in detail at this point; rather reference is made to the description of FIG. 2.

Corresponding to the device shown in FIG. 2, the device shown in FIG. 4 likewise has two first ascertainment means 401 and 402, respectively. First ascertainment means 401 is used to ascertain a lateral-motion-dynamics quantity aqAmp and an interference quantity aqStör as a function of lateral acceleration aq, both of which are supplied to block 403 which represents a third ascertainment means. First ascertainment means 402 is used to ascertain a lateral-motion-dynamics quantity omegaAmp and an interference quantity omegaStör as a function of yaw rate omega, both of which are likewise supplied to block 403. The concrete construction of the two first ascertainment means 401 and 402, respectively, is discussed in detail in connection with FIG. 5.

Besides the two lateral-motion-dynamics quantities aqAmp and omegaAmp, as well as the two interference quantities aqStör and omegaStör, speed quantity vf which describes the vehicular speed and steering quantity deltaBew are also supplied to block 403. As a function of these quantities, it is determined in block 403 whether a pendulum motion of the vehicle exists. The concrete procedure for detecting the pendulum motion is discussed in detail in connection with FIG. 6.

Starting from a block 107, a signal ASF which indicates whether a trailer or semitrailer is coupled to the towing vehicle is also supplied to block 403. The concrete evaluation of signal ASF is discussed in connection with FIG. 6.

According to FIG. 4, yaw rate omega is evaluated by itself with the aid of first ascertainment means 402. Corresponding to the depiction in FIG. 2, the evaluation of difference omegaDiff formed between yaw rate omega and associated setpoint value omegasoll is also conceivable in the second exemplary embodiment.

Figure 5:
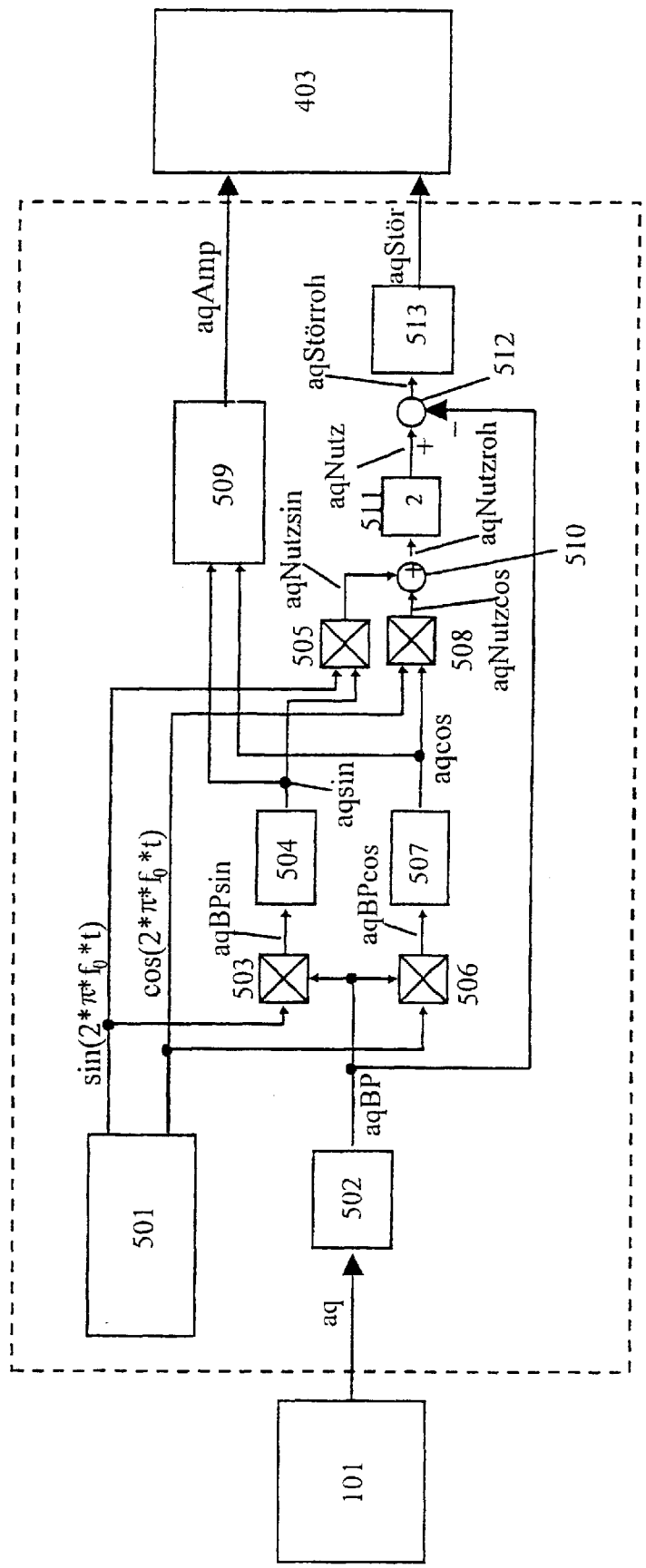
FIG. 5 shows a detailed schematic diagram of the device according to an embodiment of the present invention.

FIG. 5 shows the concrete construction of first ascertainment means 401 with which lateral-motion-dynamics quantity aqAmp and interference quantity aqStör are ascertained on the basis of lateral acceleration aq supplied to it, and are fed to block 403.

First ascertainment means 401 contains a filtering means 502 which is designed in particular as a band-pass filter. Filtering means 502 filters components aqBP, which lie in a predetermined frequency range that is characteristic for the pendulum motion of the vehicle, out of lateral acceleration aq supplied to it. Filtered-out components aqBP are supplied to a block 503, a block 506 and an addition means 512.

Block 501 represents a signal-generating means used to generate two signals $\sin(2\Pi f_0 t)$ and $\cos(2\Pi f_0 t)$ which are shifted by a predefined phase, particularly 90°. Advantageously, both signals have the same amplitude. Signal $\sin(2\Pi f_0 t)$ is fed both to a block 503 and a block 505. Signal $\cos(2\Pi f_0 t)$ is fed both to a block 506 and a block 508. The signal-generating means can be either an oscillator constructed using analog technology or an oscillator implemented using digital technology. For example, the oscillator can be implemented using digital technology if the microcontroller contained in the control unit is provided with a digital signal processor.

In block 503, which, from the function, represents a demodulation means and is practically implemented as a multiplier means or multiplier, a demodulated signal aqBPsin is generated as a function of filtered-out components aqBP and signal $\sin(2\Pi f_0 t)$. The components of signal aqBPsin which are yielded by the multiplication can be derived via "products of trigonometric functions" known from mathematics. Signal aqBPsin essentially possesses a direct component and a component at double frequency $2f_0$ relative to the frequency of signal $\sin(2\Pi f_0 t)$. Starting from block 503, signal aqBPsin is fed to a downstream filtering means 504 implemented as a low-pass filter. Demodulated signal aqBPsin is filtered by low-pass filter 504, thereby producing a signal aqsin which corresponds to the direct component contained in demodulated signal aqBPsin.

In corresponding manner, as a function of filtered-out components aqBP and signal $\cos(2\Pi f_0 t)$ supplied to demodulation means 506, the two blocks 506 and 507 generate a demodulated signal aqBPcos which, with the aid of filtering means 507 implemented as a low-pass filter, is converted into a filtered, demodulated signal aqcos.

Amplitude quantity aqAmp is ascertained by block 509 as a function of the two signals aqcos and aqsin. For example, this is carried out according to the equation $$aq\text{Amp} = \sqrt{aq\sin^2 + aq\cos^2}$$

With the aid of a modulation means 505, which is designed as a multiplier means or as a multiplier, a modulated signal aqNutzsin is generated as a function of filtered, demodulated signal aqsin and signal $\sin(2\Pi f_0 t)$. In corresponding manner, with the aid of modulation means 508, a modulated signal aqNutzcos is generated as a function of filtered, demodulated signal aqcos and signal $\cos(2\Pi f_0 t)$. The two signals aqNutzsin and aqNutzcos are fed to an addition means 510 which forms sum aqNutzroh of these two signals. Sum aqNutzroh is supplied to a weighting means 511, downstream of addition means 510, in which sum aqNutzroh is weighted with the factor 2. Signal aqNutz thus resulting is fed to subtraction means 512. Weighting with the factor 2 is necessary because, due to the demodulation and the modulation, signal aqNutzroh has a factor 0.5. However, in order to be able to calculate interference quantity aqStör, signal (aqNutz), which to this end is compared to filtered-out components aqBP, should have the same magnitude with respect to the amplitude. Quantity aqNutz represents the pendulum motion of the vehicle to be ascertained, but is free of interference effects.

Quantity aqNutz and filtered-out components aqBP are supplied to a subtractor means 512 with which a difference aqStörroh is ascertained from these input quantities. This quantity aqStörroh is supplied to a block 513 with which, using average-value generation and filtering, particularly filtering by a low-pass filter, interference quantity aqStör is ascertained which is then fed to block 403.

In the overall view, blocks 501, 503, 506, 504, 507 and 509 described above represent means by which amplitude quantity aqAmp is determined as a function of the filtered-out components. In the overall view, blocks 505, 508, 510, 511, 512 and 513 described above represent means by which interference quantity aqStör is determined as a function of the filtered-out components.

FIG. 5 depicts the procedure for ascertaining the lateral-motion-dynamics quantity as a function of the lateral acceleration. The ascertainment of the lateral-motion-dynamics quantity as a function of yaw rate omega or as a function of the difference formed between yaw rate omega and setpoint value omegasoll for the yaw rate is carried out in corresponding manner.

Figure 6:
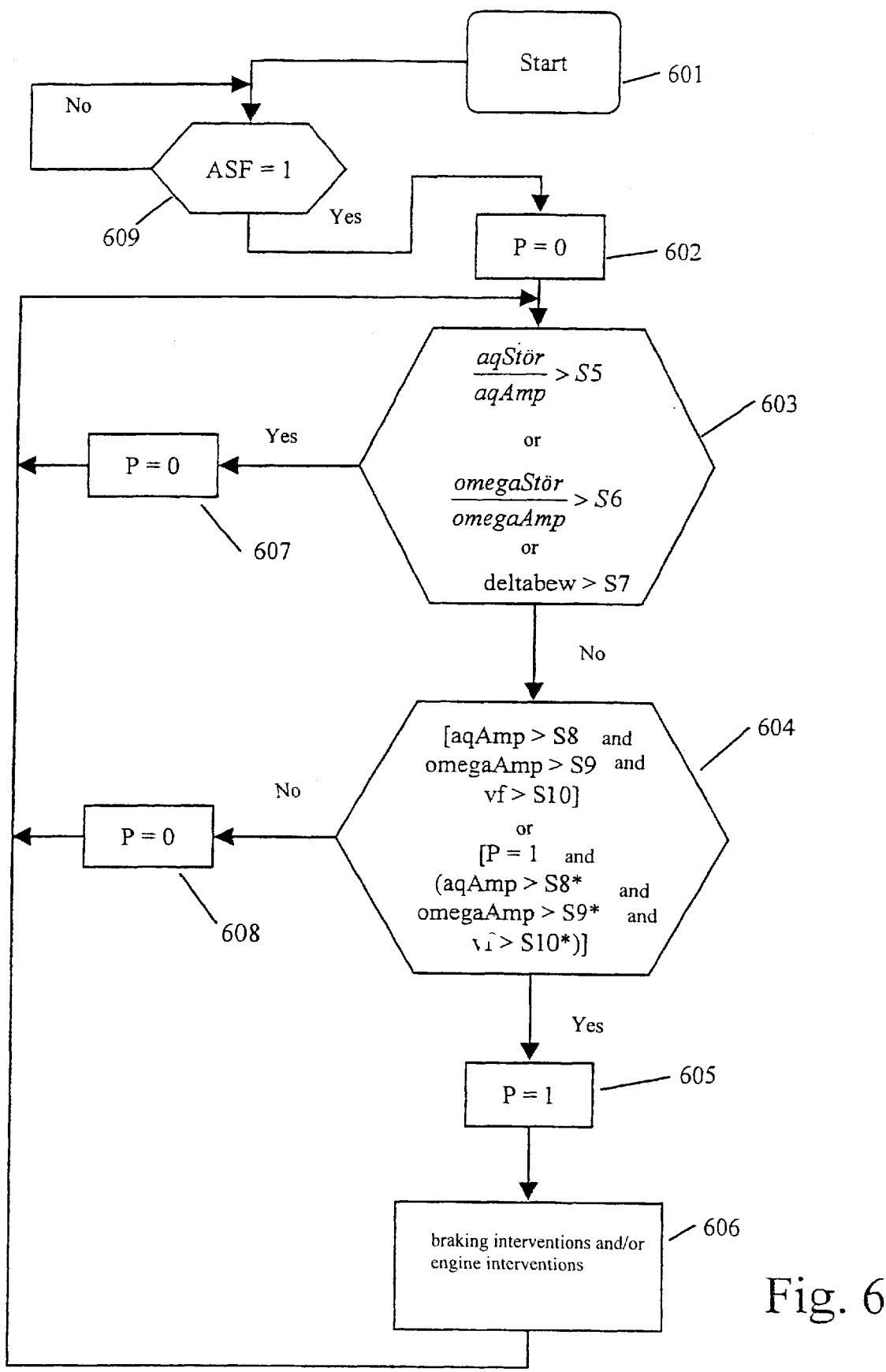

FIG. 6 shows the sequence of the method upon which the second exemplary embodiment is based. The method begins with a step 601 which is followed by a step 609. Corresponding to step 309, signal ASF is evaluated in step 609. If it is determined that signal ASF has the value 1, then subsequent to step 609, a step 602 is carried out with which the actual detection of a pendulum motion begins. If, on the other hand, it is determined that signal ASF does not have the value 1, then step 609 is carried out once more.

At this point, it should be stressed that step 609 is optional and is not absolutely necessary for carrying out the function of detecting a pendulum motion, so that it may also be omitted. If step 609 is omitted, then block 107 shown in FIG. 4 is also not necessary.

Step 602 following step 609 corresponds to step 302. Subsequent to step 602, a step 603 is carried out. In step 603, the following three individual queries are checked: Is the relationship formed by interference quantity aqStör and lateral-motion-dynamics quantity aqAmp greater than an associated threshold value S5? Is the relationship formed by interference quantity omegaStör and lateral-motion-dynamics quantity omegaAmp greater than an associated threshold value S6? Is steering quantity deltaBew greater than an associated threshold value S7? If it is determined in step 603 that one of the three individual queries is satisfied, which is synonymous with the situation that the steering movements carried out by the driver do not permit the detection of a pendulum motion, and/or the steering movements cause the implementation of a detection to appear unnecessary since, for example, a slalom-type drive is assumed which causes the pendulum motion, or else that the determined lateral-motion-dynamics quantity is not attributable to the pendulum motion actually to be ascertained, since the interference quantity is great in relation to the lateral-motion-dynamics quantity, then subsequent to step 603, a step 607 is carried out in which the value 0 is assigned to quantity P. After step 607, step 603 is carried out once more. If, on the other hand, it is determined in step 603 that none of the three individual queries is satisfied, then subsequent to step 603, a step 604 is carried out.

Corresponding to step 304, in step 604 two partial queries are carried out. In the first partial query, the following three individual queries are checked: Is lateral-motion-dynamics quantity aqAmp greater than a threshold value S8? Is lateral-motion-dynamics quantity omegaAmp greater than a threshold value S9? Is speed quantity vf greater than a threshold value S10? When these three individual queries are all satisfied simultaneously, then the first partial query is satisfied.

The second partial query contains an individual query with respect to quantity P, with which it is checked whether the value 1 is assigned to quantity P. Moreover, the second partial query includes the three individual queries contained in the first partial query, however, corresponding to step 304, having threshold values S8*, S9* and S10* whose values are in each case smaller than those of threshold values S8, S9 and S10. When all four individual queries are satisfied, then the second partial query is satisfied.

If it is determined in step 604 that one of the two partial queries is satisfied, which is synonymous with the situation that a pendulum motion of the vehicle exists, then subsequent to step 604, a step 605 is carried out which corresponds to step 305. Following step 605, a step 606 is carried out which corresponds to step 306. Subsequent to step 606, step 603 is carried out once more. If, on the other hand, it is determined in step 604 that neither of the two partial queries is satisfied, then following step 604, a step 608 is carried out which corresponds to step 308. Subsequent to step 608, step 603 is carried out once more.

The explanations already given in connection with step 304 are also applicable for the individual queries implemented in step 604 with regard to their interconnection.

Finally, it should be mentioned that the form of the exemplary embodiments selected in the description and the depiction selected in the Figures are not intended to have any limiting effect on the idea essential to the present.

Should advantageous refinements be yielded, then individual components of the two exemplary embodiments can be combined with one another.

What is claimed is:

1. A device for detecting a pendulum motion of a vehicle, comprising:
   at least one first ascertainment means for ascertaining at least one lateral-motion-dynamics quantity that represents a lateral motion dynamics of the vehicle;
   second ascertainment means for ascertaining a speed quantity that describes a vehicular speed;
   third ascertainment means for determining, as a function of the at least one lateral-motion-dynamics quantity and the speed quantity, whether a pendulum motion of the vehicle exists, wherein, in determining whether a pendulum motion of the vehicle exists, it is checked whether the at least one lateral-motion-dynamics quantity is greater than an associated first threshold value and it is checked whether the speed quantity is greater than an associated second threshold value, a pendulum motion of the vehicle existing when the at least one quantity is greater than the first threshold value, and when the speed quantity is greater than the second threshold value; and
   at least one of,
   a first detection means for detecting a lateral acceleration acting on the vehicle, one of the at least one first ascertainment means ascertaining one of the at least one lateral-motion-dynamics quantity as a function of the lateral acceleration of the vehicle; and
   a second detection means for detecting a yaw rate of the vehicle, one of the at least one first ascertainment means ascertaining one of the at least one lateral-motion-dynamics quantities as a function of the yaw rate of the vehicle;
   wherein the at least one first ascertainment means includes precisely two first ascertainment means, the two first ascertainment means being one first detection means and one second detection means.

2. The device as recited in claim 1, wherein the first detection means is a lateral-acceleration sensor, and the second detection means is a yaw-rate sensor.

3. The device as recited in claim 1,
   wherein at least one of the first and second thresholds is dependent upon whether a pendulum motion was detected, a value of the at least one of the first and second thresholds being smaller when a pendulum motion is detected than when no pendulum motion is detected.

4. The device as recited in claim 1, wherein the at least one first ascertainment means includes a first filtering means with which components that lie in a predetermined frequency range characteristic for pendulum motion of the vehicle are filtered out of an input quantity supplied to the first ascertainment means for ascertaining the at least one lateral-motion-dynamics quantity, the at least one lateral-motion-dynamics quantity being ascertained as a function of the filtered-out components.

5. The device as recited in claim 4, wherein the filtering means includes a band-pass filter.

6. The device as recited in claim 1, further comprising:
   difference ascertainment means with which a difference is ascertained between a yaw-rate setpoint value and the yaw rate of the vehicle;
   wherein one of the at least one lateral-motion-dynamics quantity is ascertained as a function of the difference.

7. The device as recited in claim 1, further comprising:
   actuating means for influencing a torque supplied by one of an engine and brakes allocated to wheels of the vehicle;
   wherein, in response to a detected pendulum motion of the vehicle, at least one of the following occurs:
      the actuating means for influencing the torque supplied by the engine and the brakes allocated to the wheels of the vehicle are driven to reduce the vehicular speed by activating the brakes uniformly; and
      the brakes allocated to the wheels of the vehicle are activated individually in such a way that a yawing moment is thereby generated which acts on the vehicle and counteracts the pendulum motion.

8. The device as recited in claim 1, wherein the device is adapted to be used in an arrangement for controlling a quantity describing the operating dynamics of the vehicle.

9. The device as recited in claim 8, wherein the quantity describing the operating dynamics of the vehicle is a yaw rate of the vehicle.

10. The device as recited in claim 1, wherein the vehicle is a vehicle combination made up of a towing vehicle and at least one of a trailer and a semitrailer, the pendulum motion of the at least one of the trailer and the semitrailer being detected by the device.

11. The device as recited in claim 10, wherein all of at least one of detection means and sensor means used for detecting the pendulum motion are allocated to the towing vehicle.

12. The device as recited in claim 11, further comprising:
   coupling detection means used to determine whether at least one of a trailer and a semitrailer is coupled to the towing vehicle, the detection of a pendulum motion being performed when it is determined that at least one of a trailer and a semitrailer is coupled to the towing vehicle.

13. The device as recited in claim 12, wherein the coupling detection means includes an electrical contact which is checked to determine whether at least one of a trailer and a semitrailer is coupled to the towing vehicle.

14. A device for detecting a pendulum motion of a vehicle, comprising:
    at least one first ascertainment means for ascertaining at least one lateral-motion-dynamics quantity that represents a lateral motion dynamics of the vehicle;
    second ascertainment means for ascertaining a speed quantity that describes a vehicular speed;
    third ascertainment means for determining, as a function of the at least one lateral-motion-dynamics quantity and the speed quantity, whether a pendulum motion of the vehicle exists, wherein, in determining whether a pendulum motion of the vehicle exists, it is checked whether the at least one lateral-motion-dynamics quantity is greater than an associated first threshold value and it is checked whether the speed quantity is greater than an associated second threshold value, a pendulum motion of the vehicle existing when the at least one lateral-motion-dynamics quantity is greater than the first threshold value, and when the speed quantity is greater than the second threshold value; and
    fourth ascertainment means with which a steering quantity is ascertained that represents a steering movement carried out by a driver, the fourth ascertainment means including:
        an integrating means to ascertain the steering quantity as a function of steering angles adjusted by the driver over a predetermined period of time;
        a masking means having a suitably selected dead zone, the masking means masking out small steering angles;
        a high-pass filter, the high pass filter filtering out steering angles resulting from steering-angle changes proceeding slowly over time;
    wherein the third ascertainment means determines whether a pendulum motion of the vehicle exists as a function of the steering quantity, a pendulum motion not being determined when the value of the steering quantity is greater than a third threshold value.

15. A device for detecting a pendulum motion of a vehicle, comprising:
    at least one first ascertainment means for ascertaining at least one lateral-motion-dynamics quantity that represents a lateral motion dynamics of the vehicle;
    second ascertainment means for ascertaining a speed quantity that describes a vehicular speed; and
    third ascertainment means for determining, as a function of the at least one lateral-motion-dynamics quantity and the speed quantity, whether a pendulum motion of the vehicle exists, wherein, in determining whether a pendulum motion of the vehicle exists, it is checked whether the at least one lateral-motion-dynamics quantity is greater than an associated first threshold value and it is checked whether the speed quantity is greater than an associated second threshold value, a pendulum motion of the vehicle existing when the at least one lateral-motion-dynamics quantity is greater than the first threshold value, and when the speed quantity is greater than the second threshold value, wherein:
        the at least one first ascertainment means includes a first filtering means with which components that lie in a predetermined frequency range characteristic for pendulum motion of the vehicle are filtered out of an input quantity supplied to the first ascertainment means for ascertaining the at least one lateral-motion-dynamics quantity, the at least one lateral-motion-dynamics quantity being ascertained as a function of the filtered-out components, and
        the at least one first ascertainment means includes second filtering means for forming an average value, the at least one lateral-motion-dynamics quantity being ascertained as a function of filtered-out components by averaging, the at least one first ascertainment means further including an absolute-value generation means with which absolute values of the filtered-out components are ascertained prior to forming the average value.

16. The device as recited in claim 13, wherein the second filtering means includes a low-pass filter.

17. A device for detecting a pendulum motion of a vehicle, comprising:
    at least one first ascertainment means for ascertaining at least one lateral-motion-dynamics quantity that represents a lateral motion dynamics of the vehicle;
    second ascertainment means for ascertaining a speed quantity that describes a vehicular speed; and
    third ascertainment means for determining, as a function of the at least one lateral-motion-dynamics quantity and the speed quantity, whether a pendulum motion of the vehicle exists, wherein, in determining whether a pendulum motion of the vehicle exists, it is checked whether the at least one lateral-motion-dynamics quantity is greater than an associated first threshold value and it is checked whether the speed quantity is greater than an associated second threshold value, a pendulum motion of the vehicle existing when the at least one lateral-motion-dynamics quantity is greater than the first threshold value, and when the speed quantity is greater than the second threshold value, wherein:
        the at least one first ascertainment means includes a first filtering means with which components that lie in a predetermined frequency range characteristic for pendulum motion of the vehicle are filtered out of an input quantity supplied to the first ascertainment means for ascertaining the at least one lateral-motion-dynamics quantity, the at least one lateral-motion-dynamics quantity being ascertained as a function of the filtered-out components; and
        the at least one first ascertainment means includes at least one of:
            first means with which, as a function of the filtered-out components, an amplitude quantity is ascertained which represents an amplitude of the input quantity supplied to the first ascertainment means, this amplitude quantity corresponding to the at least one the lateral-motion-dynamics quantity, and
            second means with which, as a function of the filtered-out components, an interference quantity is ascertained that represents components of the input quantity supplied to the first ascertainment which are independent of the pendulum motion of the vehicle to be ascertained, the ascertainment taking place in the third ascertainment means is furthermore carried out as a function of the interference quantity.

18. The device as recited in claim 17, wherein detection of the pendulum motion is not performed when a relationship formed by the interference quantity and the amplitude quantity is greater than a relationship threshold value.

19. The device as recited in claim 17, wherein:

the first means include signal-generating means with which two signals are generated that have the same amplitude and are shifted by a predefined phase, the first means also include demodulation means with which two demodulated signals are generated as a function of the filtered-out components and the two signals generated by the signal-generating means, the first means further including filtering means with which the demodulated signals are filtered, the amplitude quantity being ascertained as a function of the filtered, demodulated signals; and the second means include modulation means, with which, as a function of the two filtered, demodulated signals and the two signals generated by the signal-generating means, two modulated signals are generated, the second means also including addition means to which the two modulated signals are supplied, the second means also including downstream weighting means, a quantity representing the pendulum motion of the vehicle being ascertained using the addition means and the weighting means, the quantity being free of interference effects, the second means further including subtraction means with which, as a function of the filtered-out components and the quantity, a second quantity is determined from which the interference quantity is ascertained by absolute-value generation and filtering using a low-pass filter.

20. The device as recited in claim 19, wherein the predefined phase is 90 degrees, the demodulation means are multiplier means, the filtering means are low-pass filters and the modulation means are multiplier means.

21. A method for detecting a pendulum motion of a vehicle, comprising the steps of:

determining at least one lateral-motion-dynamics quantity which represents lateral motion dynamics of the vehicle;

determining a speed quantity which describes a vehicular speed;

determining a steering quantity that represents a steering movement carried out by a driver;

ascertaining, as a function of the at least one lateral-motion-dynamics quantity, the speed quantity and the steering quantity, whether a pendulum motion of the vehicle exists;

checking whether the at least one lateral-motion-dynamics quantity is greater than an associated first threshold value; and checking whether the speed quantity is greater than an associated second threshold value;

wherein a pendulum motion of the vehicle exists when the at least one lateral-motion-dynamics quantity is greater than the first threshold value, and when the speed quantity is greater than the second threshold value; and wherein a pendulum motion does not exist when a value of the steering quantity is greater than a third threshold value.

* * * * *

UNITED STATES PATENT AND TRADEMARK OFFICE
CERTIFICATE OF CORRECTION

PATENT NO. : 6,600,974 B1
DATED : July 29, 2003
INVENTOR(S) : Ansgar Traechtler

It is certified that error appears in the above-identified patent and that said Letters Patent is hereby corrected as shown below:

Column 8,
Line 44, delete "Exemplary Embodiments"

Column 15,
Line 34, change "present." to -- present invention. --

Signed and Sealed this

Sixth Day of July, 2004

JON W. DUDAS
*Acting Director of the United States Patent and Trademark Office*